Nov. 3, 1936.    H. O. LINDGREN    2,059,372
LIQUID DISCHARGE DEVICE FOR CENTRIFUGAL SEPARATORS
Filed June 7, 1935
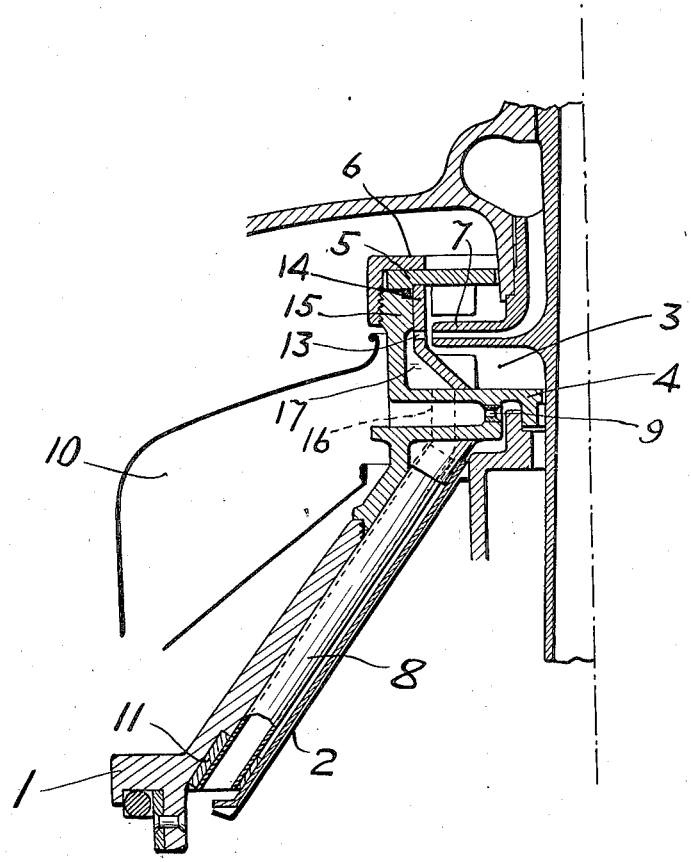
WITNESS:
INVENTOR
Hans Olof Lindgren
BY
ATTORNEYS.

Patented Nov. 3, 1936

2,059,372

UNITED STATES PATENT OFFICE 2,059,372

LIQUID DISCHARGE DEVICE FOR CENTRIFUGAL SEPARATORS

Hans Olof Lindgren, Appelviken, Sweden, assignor to The De Laval Separator Company, New York, N. Y., a corporation of New Jersey Application June 7, 1935, Serial No. 25,380
In Sweden September 1, 1934

4 Claims. (Cl. 233—22)

My invention relates to a centrifugal bowl of the type in which the skim milk is discharged through a pipe communicating with the bowl, whereas the cream flows out through an open outlet. The skim milk may flow out either through a tight connection in the form of a stuffing box or through a paring or skimming device which communicates with the pipe and projects into a chamber in the centrifugal bowl. The invention involves a construction providing for the discharge of the skim milk above the cream outlet and rendering it possible to discharge the cream from the bowl hood without risk that the liquids can become remixed.

The accompanying drawing shows an embodiment of the invention. The figure is a vertical sectional view through the upper part of the bowl at one side of its axis. 1 is the bowl hood, which is located over the top conical disc 2. In the said bowl hood is a chamber 3, the lower part of which is bounded by a disc-shaped element 4 and the upper part by a detachable lid 5, which is kept in place by a ring 6. In the chamber 3 a paring or skimming device 7 is provided. The skim milk is conducted into the chamber 3 through tubes 8, by which the chamber 3 communicates with the peripheral part of the separating chamber. The tubes 8 are tightly connected to the disc 4, in which are arranged channels 9 through which the cream discharges into a collecting vessel 10. The tubes 8 are tightly fixed in the hood 1 by a reinforcing piece 11 which presses against the disk 2. By means of this arrangement it is possible to conduct the skim milk to a higher level than the cream outlet, without entailing the formation of a slot between two elements detachable from each other. Such places of leakage could not be avoided if the generally known construction were used according to which the skim milk is conducted upwards between the hood and a conical disc located inside it and provided with a neck from which the cream is discharged through an opening in the hood. The arrangement under consideration offers particularly great advantages in connection with a known regulating device in which it is assumed that considerable changes of level may take place entailing a great risk that the skim milk may leak out from the chamber between the hood and the top disc to the cream outlet. A small leakage of skim milk to the cream does not cause any great disadvantages as long as the bowl is adjusted for taking out thin cream. If, on the other hand, the bowl be adjusted for extracting thick cream, such a dilution as will occur after the lapse of separation will have a prejudicial effect, inasmuch as in the set of discs there will be a more concentrated cream flowing inwards toward the center of the bowl. If the cream be too concentrated, this may give rise to cream deposits on the intermediate discs, which in turn produces a reduced efficiency of the set of discs and may cause clogging or stoppage.

The device in question also offers complete security against leakage of cream into the skim milk, which is a risk that always exists when a detachable top disc is used.

It is desirable that the skim milk from the tubes 8 be passed through a closed conduit to the inlet orifices of the paring device 7. This may be effected either by the tubes 8 in the interior of the bowl neck being directed upwards and then inwards so that the discharge mouths of the tubes extend radially and open outside and close to the admission orifices in the paring device, or by the chamber 3 being provided with an insertion piece 14 fitted with, or forming, together with the bowl neck, suitably shaped channels connecting the discharge mouths of the tubes 8 with radially located openings 13 immediately in front of the admission mouths of the paring device. The insertion piece 14 may conveniently be connected in a detachable way with the bowl hood so as to be removable when the channels are to be cleaned. It may consist of an upper cylindrical part, which is fitted in the upper part 15 of the bowl hood 1, and a lower part of conical shape whose lower edge rests upon the bottom of chamber 3 and is located quite inside the inner mouths of the tubes 8. In the bottom partition 4 there are a number of vertical holes 16 which communicate with the tubes 8 and conduct the milk from the tubes to the part of chamber 3 outside the insertion piece 14. In this chamber there are a number of radially located partition walls 17, which together with the element 14 and the neck of the bowl hood form sub-chambers each of which communicates with one of the pipes 8 and each of which is provided in partition 14 with an orifice 13 located opposite and substantially coaxial with an inlet mouth of the skimming device.

What I claim and desire to protect by Letters Patent is:

1. In a centrifugal separator, the combination, with the rotary bowl and its hood, of an enclosure mounted on the bowl hood and rotating therewith, means providing an outlet for the lighter separated constituent below said enclosure, a partition in said enclosure dividing it into an inner chamber and an outer chamber, a skimming device extending into the inner chamber with inlet openings close to said partition, tubes communicating with the peripheral space of the bowl and with said outer chamber, there being orifices in said partition opposite and substantially coaxial with the inlet openings of the skimming device, and radial partitions in said outer chamber dividing it into sub-chambers each provided with one of said orifices and communicating with one of said tubes.

2. In a centrifugal separator, the combination, with the rotary bowl and its hood, of a skimming chamber mounted on the hood and rotating therewith, a skimming device in said chamber having inlet mouths, means providing passages communicating at their inlet ends with the peripheral part of the bowl and at their outlet ends opening opposite, close to, and substantially coaxial with the inlet mouths of the skimming device, the bottom of said chamber being provided with discharge channels for the lighter separated constituents and with relatively restricted orifices at the inner ends of the channels communicating with the central zone of the bowl.

3. In a centrifugal separator, the combination with the rotary bowl and its hood, of an enclosure mounted on the bowl hood and rotating therewith, a partition in said chamber dividing it into an inner chamber and an outer chamber, a skimming device extending into the inner chamber with its inlet opening close to said partition, and a tube communicating with the peripheral space of the bowl and with said outer chamber, the partition having an orifice opposite to and substantially coaxial with the inlet opening of the skimming device, the lower end of said partition extending substantially closer than the inlet opening of the skimming device to the axis of the bowl.

4. In a centrifugal separator, the combination with the rotary bowl and its hood, of an enclosure mounted on the bowl hood and rotating therewith, a partition in said chamber dividing it into an inner chamber and an annular outer chamber, a skimming device extending into the inner chamber and having inlet mouths opening close to said partition, the partition comprising a substantially cylindrical upper portion having openings opposite the inlet mouths of the skimming device and an inwardly extending conical portion whose lower end extends substantially closer than said inlet mouths to the axis of the bowl.

HANS OLOF LINDGREN.